June 14, 1966  M. M. McQUEEN  3,255,773
ICE-FREE VALVE
Filed Oct. 28, 1963  5 Sheets-Sheet 1

INVENTOR:
Malcolm M. McQueen
By Smyth, Roston & Pavitt
Attorneys

June 14, 1966 M. M. McQUEEN 3,255,773
ICE-FREE VALVE
Filed Oct. 28, 1963 5 Sheets-Sheet 2

INVENTOR:
Malcolm M. McQueen
Smyth, Roston & Pavitt
Attorneys

June 14, 1966  M. M. McQUEEN  3,255,773
ICE-FREE VALVE

Filed Oct. 28, 1963  5 Sheets-Sheet 3

INVENTOR:
Malcolm M. McQueen

By Smyth, Roston & Pavitt
Attorneys

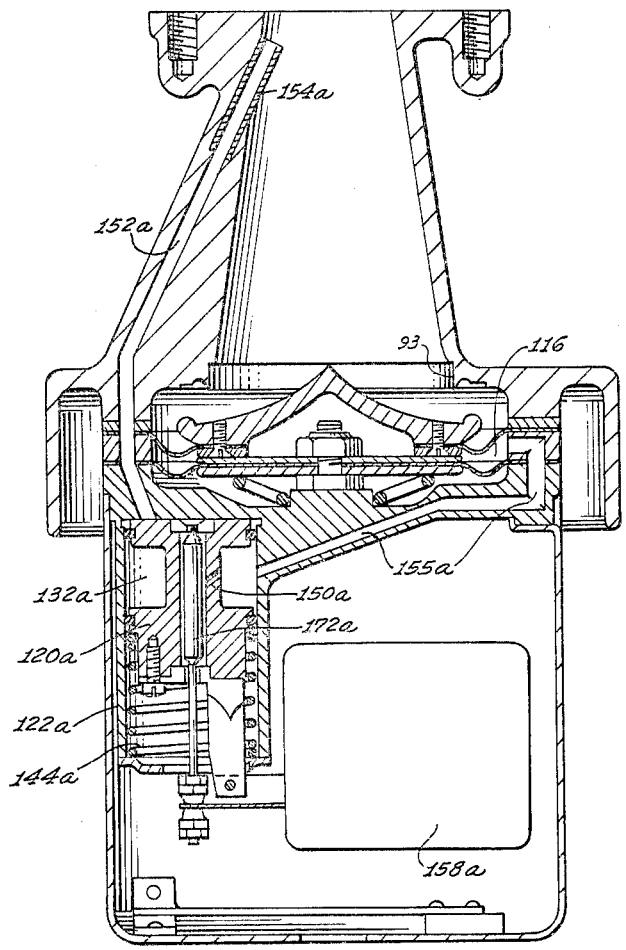

June 14, 1966   M. M. McQUEEN   3,255,773
ICE-FREE VALVE
Filed Oct. 28, 1963   5 Sheets-Sheet 5
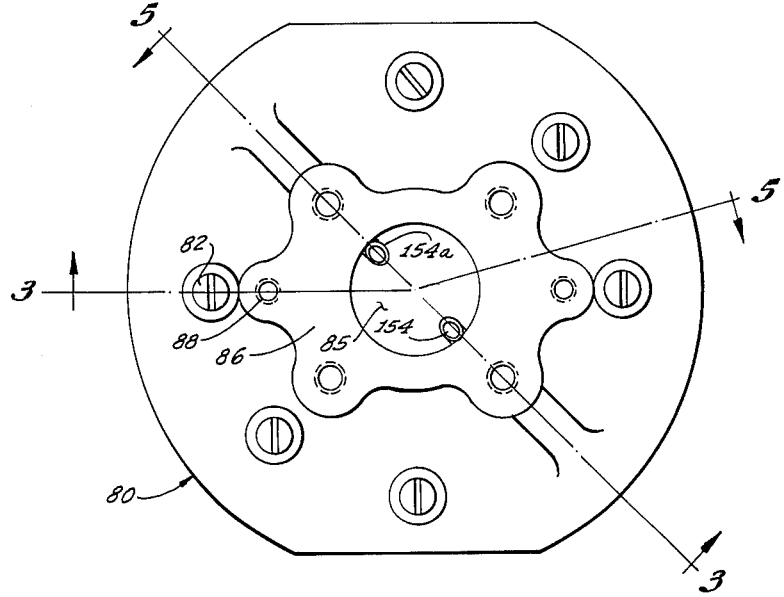
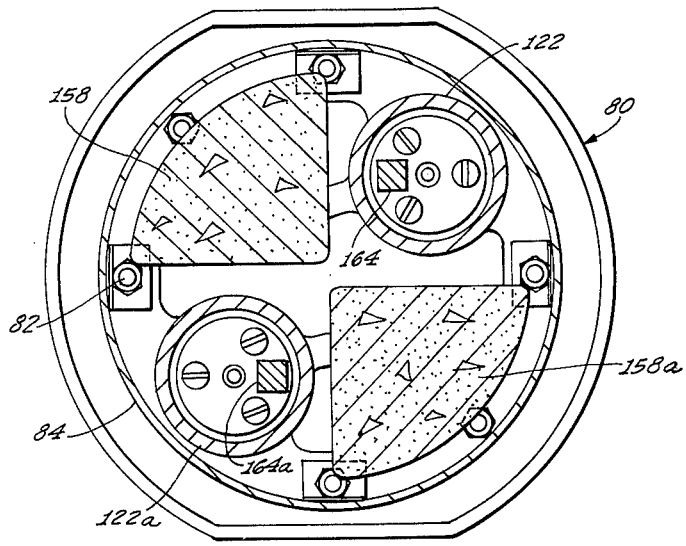
INVENTOR:
Malcolm M. McQueen
Attorneys

# United States Patent Office 3,255,773
Patented June 14, 1966

3,255,773
ICE-FREE VALVE
Malcolm M. McQueen, Northridge, Calif., assignor to Whittaker Corporation, a corporation of California
Filed Oct. 28, 1963, Ser. No. 319,272
12 Claims. (Cl. 137—414)

This invention relates to a valve assembly in which a main valve is controlled by a pilot valve and the pilot valve in turn is subject to control forces.

The invention was conceived to meet the problem of ice particles interfering with the operation of float-controlled fuel transfer valves on aircraft. It will be readily appreciated, however, that the valve assembly has utility for installations other than aircraft installations and for use with liquids other than aircraft fuels.

The icing difficulties encountered in the operation of fuel level control valves on aircraft arise because the presence of small quantities of water in liquid fuel is unavoidable and when the temperature of the fuel drops below 30° F. small ice particles inevitably precipitate out of the mixture. Such icing occurs whenever an aircraft flies a mission under conditions where the fuel is initially above 32° F. and is then subjected to an ambient temperature substantially below 32° F. The ice particles commonly accumulate in the region of the main valve seat to interfere with the closing of the main valve and the ice particles also accumulate in the pilot valve passage and too often completely clog the pilot valve passage.

The invention is based on certain discoveries regarding the tendency of the ice particles to accumulate in these two regions.

One discovery is that while the ice particles will accumulate around the main valve seat if the main valve seat is only partially open, the ice particles will be swept past the accumulation region if the main valve is wide open. The difficulty is that in the operation of a typical fuel transfer valve, the main valve is modulated in that the pilot valve has a tendency to vary the rate of fuel flow through the main valve as a function of the restriction of the pilot valve passage. Consequently the main valve is held partially open for substantial periods of time. This discovery reveals the necessity of avoiding modulation of the main valve and instead arranging for the main valve to open and close completely and rapidly.

Another discovery is that while fuel will clog up a pilot valve passage of the usual cross-sectional dimension if the fuel is bled through the pilot valve passage continuously for a prolonged period of time, such clogging may be prevented by providing a relatively short pilot valve passage and permitting the fuel to flow through the short pilot valve passage for only a short period of time, or the clogging may be prevented by increasing the diameter of the pilot valve passage to a diameter substantially greater than the usual one-quarter inch diameter. Since for good reasons it is preferable not to increase the diameter of the pilot valve passage unduly, the indicated solution is to provide for only short periods of flow through a relatively short pilot valve passage.

These two solutions are combined in a compatible manner by providing what may be termed a power chamber to operate the main valve and by employing what may be termed a bi-stable pilot valve in conjunction with the power chamber. The pilot valve seeks two opposite limit positions with no tendency to linger between the two limit positions and the power chamber opens the main valve fully in response to movement of the pilot valve to one of its two limit positions and completely closes the main valve in response to movement of the pilot valve to the other of its two limit positions.

Even though the pilot valve may stay in either of its alternate limit positions for prolonged periods of time, only short periods of flow occur through the pilot valve because flow is created only briefly whenever the pilot valve is changed from one position to the other. Thus when the pilot valve is reversed from one limit position to the other, fuel flows through the pilot valve only long enough to create effective pressure in the power chamber and when the pilot valve is reversed to the other limit position fuel flow occurs through the pilot valve only long enough to relieve the pressure in the power chamber.

The described valve arrangement is highly satisfactory if a control force is applied in opposite respect to the pilot valve at intervals of time of sufficient duration to permit the pressure in the power chamber either to be raised to the maximum or to be lowered to the minimum. Reversals of the pilot valve at less intervals of time, in effect, cause the main valve to modulate and thus favor the accumulation of ice particles.

If means is employed to operate the pilot valve in response to changes in the liquid level in the tank, for example, if float means is employed for this purpose, reversal of the pilot valve may occur too frequently, once the tank is full, because only a slight drop in the liquid level suffices to reverse the pilot valve.

A further feature of the invention is the concept of avoiding such closely repeated reversals of the pilot valve by, in effect, making the level-sensing means nonresponsive to initial lowering of the liquid level in the tank from the level at which the main valve closes. Thus the main valve opens wide to fill the tank and then stays completely closed until there is a substantial drop in the liquid level in the tank.

In the preferred practice of the invention, this concept is carried out simply by providing means to depress the level-sensing means in response to closing of the main valve so that the level-sensing means becomes insensitive to subsequent drop in the liquid level until the given level is reached. This purpose of the invention may be accomplished by depressing the level-sensing means through only a short distance, for example, ⅜ inch.

A further discovery is that the provision of a valve action for cutting effect prevents pieces of ice from jamming the main valve. Thus, either the moving valve member or the stationary valve seat may be provided with a cutting element equivalent to a circular knife. With the knife perpendicular to the surface with which it coacts, a jam angle is avoided.

In one practice of the invention the main valve member is arranged to close by downward movement, the pilot valve is carried by the main valve to move downward therewith, and the float means is connected to the pilot valve to be depressed by the downward movement of the main valve. In another practice of the invention the pilot valve is separate from the main valve but is carried by fluid-responsive-means which moves downward in response to a pressure change created by the closing of the main valve.

The features and advantages of the invention may be understood from the following detailed description and the accompanying drawings:

In the drawings, which are to be regarded as merely illustrative:

FIG. 5 is a sectional view similar to FIG. 3 taken along the angular line 4—4 of FIG. 6 showing the second pilot valve for controlling the main valve independently of the first pilot valve;

FIG. 6 is a bottom view of the second embodiment of the invention; and

FIG. 7 is a transverse section of the second embodiment of the invention taken along the line 7—7 of FIG. 3.

Figure 1:
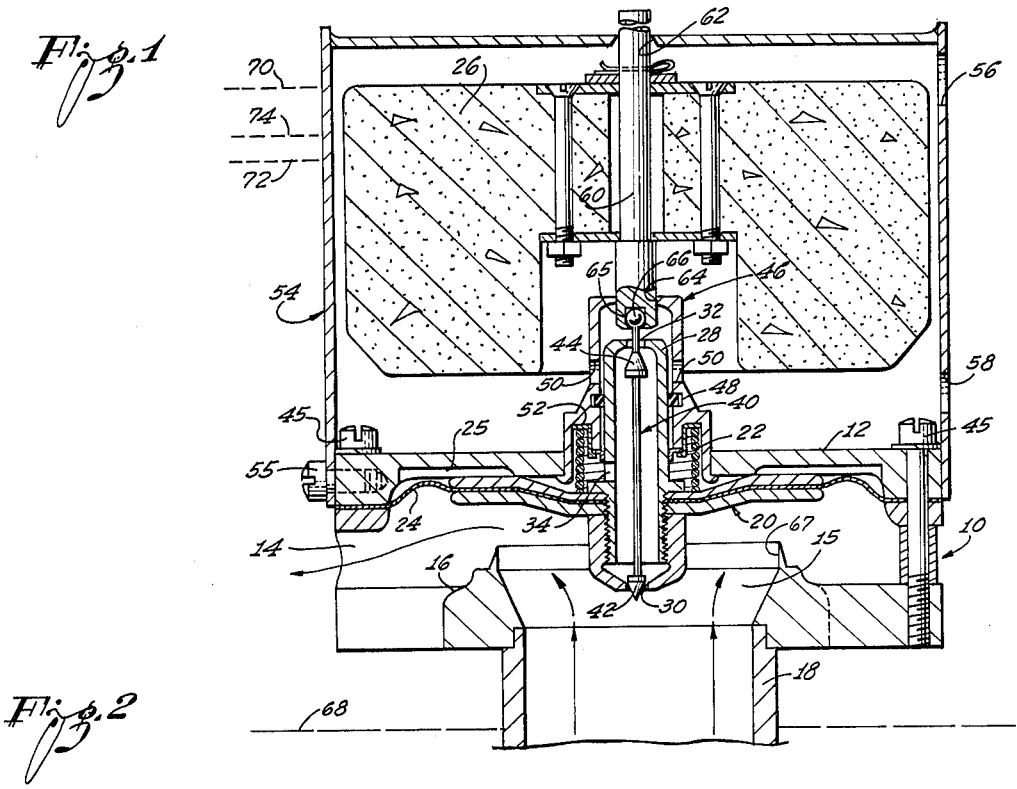
FIG. 1 is a longitudinal sectional view of one embodiment of the invention with the pilot valve in one of its two limit positions and with the main valve wide open.
Figure 2:
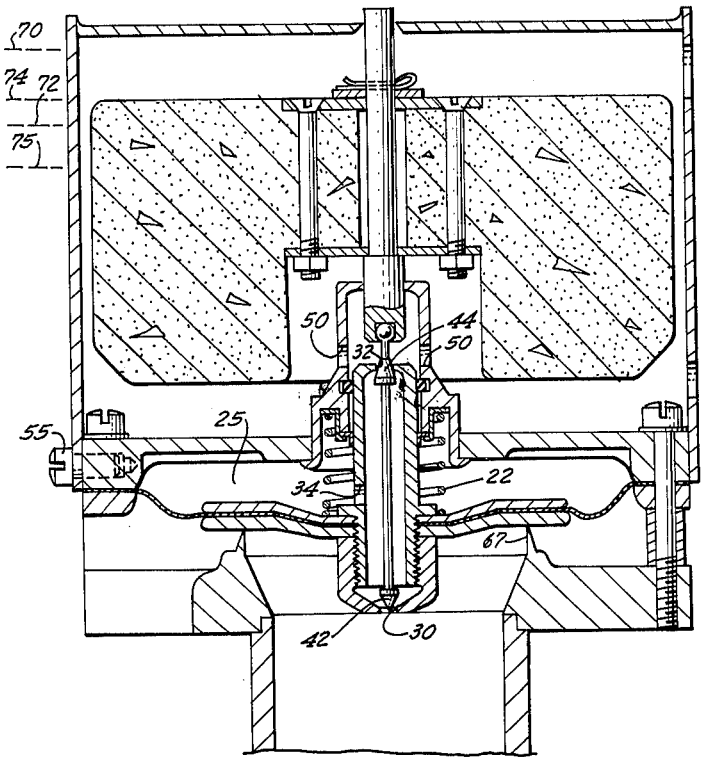
FIG. 2 is a similar view showing the pilot valve at its alternate limit position with the main valve fully closed.

The principal parts of the valve assembly of the first embodiment of the invention shown in FIGS. 1 and 2 include: a main valve body, generally designated 10, having an upper wall 12, an outlet port 14, and an inlet port 15 forming a valve seat 16, the main valve body being mounted on a standpipe 18 that supplies the fuel; a main valve member 20; a coil spring 22 that urges the main valve member downward towards its closed position against the valve seat 16; a diaphragm 24 which carries the main valve member 20 and which together with the upper wall 12 of the valve body forms what may be termed a power chamber 25 for closing the main valve member in cooperation with the spring 22; a float 26 to respond to rise in the liquid level in the tank in which the valve assembly is mounted; a cylindrical pilot valve body, generally designated 28, having a first inlet port 30 in communication with the inlet side of the main valve member 20, a second outlet port 32 in communication with the exterior of the main valve body 10 and therefore in communication with the main outlet port 14 when the main valve member 20 is in its closed position, and a third port 34 which is in communication with the power chamber 25; and a pilot valve member, generally designated 40, inside the pilot valve body 28, the pilot valve member being operatively connected to the float 26 and having both a lower tapered valve head 42 for cooperation with the first inlet port 30 of the pilot valve body and an upper tapered valve head 44 for cooperation with the second upper outlet port 32 of the pilot valve body.

In the construction shown, the main valve body 10 is made in a number of sections for ease of fabrication as well as for gripping the margin of the diaphragm 24, the sections being held together by suitable screws 45. The upper fixed wall 12 of the main valve body 10 carries an axial tubular extension, generally designated 46, the lower end of which opens into the power chamber 25. The tubular pilot valve body 28 which is carried by the main valve member 20 is slidingly embraced by the tubular extension 46 with a suitable sealing ring 48 embracing the pilot valve body. The tubular extension 46 has outlet apertures 50 to place the outlet port 32 of the pilot valve body in communication with the exterior of the main valve body and the tubular extension is further formed with an annular recess to house an annular seat member 52 to receive the pressure of the upper end of the spring 22.

The float 26 is enclosed by a suitable float housing 54 that is mounted on the upper side of the main valve body 10 by suitable screws 55. The float housing 54 is of open construction to permit free flow of the ambient liquid into and out of the housing and for this purpose may have at least one upper aperture 56 and at least one lower aperture 58.

The float 26 may be fixedly mounted on a short axial rod 60 with freedom for vertical movement, suitable means being provided to guide the axial rod. In the construction shown, the upper end of the axial rod 60 extends through a guide aperture 62 in the upper wall of the float housing 54 and the lower end of the axial rod slidingly extends into a second guide aperture 64 in the upper end of the fixed tubular extension 46 of the main valve body 10. For the purpose of operatively connecting the float 26 to the pilot valve member 40, the lower end of the axial rod 60 is formed with a socket 65 which encloses and retains a ball-shaped enlargement 66 on the upper end of the pilot valve member 40.

The operation of this first embodiment of the invention may be understood from the foregoing description. FIG. 1 shows the position of the parts of the valve assembly in the course of an operation for filling the tank in which the valve assembly is mounted. The rising liquid, for example, may be at the level indicated by the broken line 68. At this time the float 26 is at its lower position, the upper surface of the float being at the level indicated by the broken line 70.

Since the float 26 is at its lower position, the pilot valve member 40 is at its lowest position with the lower valve head 42 closing the lower inlet port 30 and with the upper valve head 44 retracted downward from the outlet port 32. With the outlet port 32 open, the power chamber 25 is vented to the atmosphere and consequently is at a pressure substantially below the pressure of the fuel from the pressurized fuel source. Since the interior of the power chamber 25 is at such low pressure, the pressure of the fuel on the inlet side of the main valve member 20 forces the main valve member to open position away from the valve seat 16 in opposition to the valve spring 22.

When the float 26 is lifted by the rising liquid in the tank, for example, when the liquid in the tank rises to the predetermined level indicated by the broken line 72, the upward movement of the float shifts the pilot valve member 40 upward to the position shown in FIG. 2, the upper valve head 44 of the pilot valve member closing the upper outlet port 32 and the lower valve head 42 opening the lower inlet port 30. With the pilot valve member 40 in this upper position, the power chamber 25 is in communication with the inlet side of the main valve member 20, the path of communication being through the port 34 of the pilot valve body 28, the interior of the pilot valve body, and the lower port 30 of the pilot valve body. The pressure in the power chamber 25 builds up promptly to force the main valve member 20 to its closed position with some help from the spring 22 the closed position of the main valve member being shown in FIG. 2.

It is important to note that the valve seat 16 is formed with a sharp edge and functions, in effect, as a circular knife. The knife surface 67 is a cylindrical surface perpendicular to the cooperating surface of the valve member 20 to avoid a jam angle.

As long as the float 26 remains elevated, as shown in FIG. 2, and the pressure from the fuel source is exerted against the underside of the main valve member 20, the main valve member remains at its closed position because the fluid pressure in the power chamber 25 acts on a larger area of the main valve member than the area of the underside of the valve member defined by the valve seat 16. If the underside of the main valve member 20 is not subjected to the pressure from the fuel source, the spring 22 suffices to keep the main valve member in its closed position regardless of whether or not the float 26 is elevated.

When the main valve member 20 is acted upon by the pressure in the power chamber 25 and drops from its upper open position shown in FIG. 1 to its lowered closed position in FIG. 2, the pilot valve body 28 is carried downward by the main valve member and the pilot valve member 40 is carried down correspondingly to pull the float 26 downward into the liquid. Thus with the top of the float at the level 70 when the liquid rises to the predetermined critical level 72, the closing movement of the main valve member pulls the float downward to bring the top of the float to the lower level 74. The difference between the two float levels 70 and 74 may be on the order of three-eighths of an inch.

It is apparent that with the rise of the liquid in the tank to the level 72 to cause the float to be depressed from the level 70 to the level 74, the float will thereafter be nonresponsive to initial lowering of the liquid level in the tank. Thus the liquid level must drop from the critical level 72 approximately three-eighths of an inch before the float will respond by dropping the pilot valve member 40 to its lower position.

The second embodiment of the invention shown in FIGS. 3 to 7, differs from the first embodiment in two respects. In the first place, the valve assembly is adapted to be suspended from an inlet port in the upper wall of a fuel tank. In the second place, the valve assembly has two independent floats associated with two independent pilot valves to control two power chambers that are independently capable of cutting off flow into the tank. The construction of the valve assembly may be understood by considering FIG. 3 which is a sectional view showing the main valve member and the first of the two pilot valves to which the main valve member responds.

Figure 3:
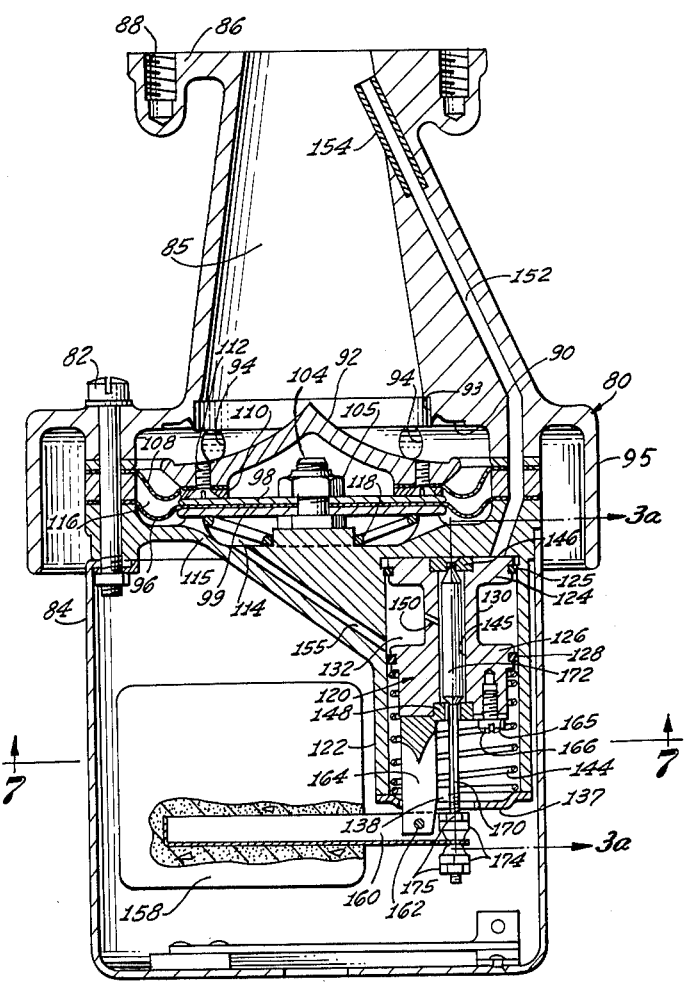
FIG. 3 is a longitudinal sectional view of a second embodiment of the invention that incorporates two pilot valves, the view showing one of the two pilot valves in one of its alternate limit positions with the main valve fully open, the section being taken along the angular line 3—3 of FIG. 6.

In FIG. 3, the main valve body, generally designated 80, is made in a number of parts interconnected by suitable screws 82 and carries a downwardly extending float housing 84 of open construction. The inlet port of the main valve body 80 is in the form of a tapered inlet passage 85 which is provided at its upper end with a radial flange 86 having threaded blind bores 88 for use in attaching the valve assembly to the inlet opening of a fuel tank. The lower end of the inlet passage 85 flares to form a valve seat 90 for cooperation with a main valve member 92. Here again, the valve seat is formed with a circular knife element having an inner cylindrical surface 93 that is substantially perpendicular to the cooperative surface of the main valve member 92. Below the valve seat 90, the main valve body has a circumferential series of outlet ports 94 which are overhung by a baffle in the form of a cylindrical skirt 95.

The central portion of a first diaphragm 96 is sandwiched between a pair of disks 98 and 99 which are secured together by a screw 104 and a cooperating nut 105. The central portion of a second diaphragm 108 is connected to the main valve member 92 by means of a ring 110 and cooperating screws 112. This arrangement forms a first lower power chamber 114 between the first diaphragm 96 and a lower transverse wall 115 and forms a second power chamber 116 defined by the two diaphragms and the main valve member 92. A suitable spiral spring 118 in the lower power chamber 114 exerts upward pressure against the pair of disks 98 and 99 thereby to urge the main valve member 92 towards its closed position against the overhanging valve seat 90.

Figure 4:
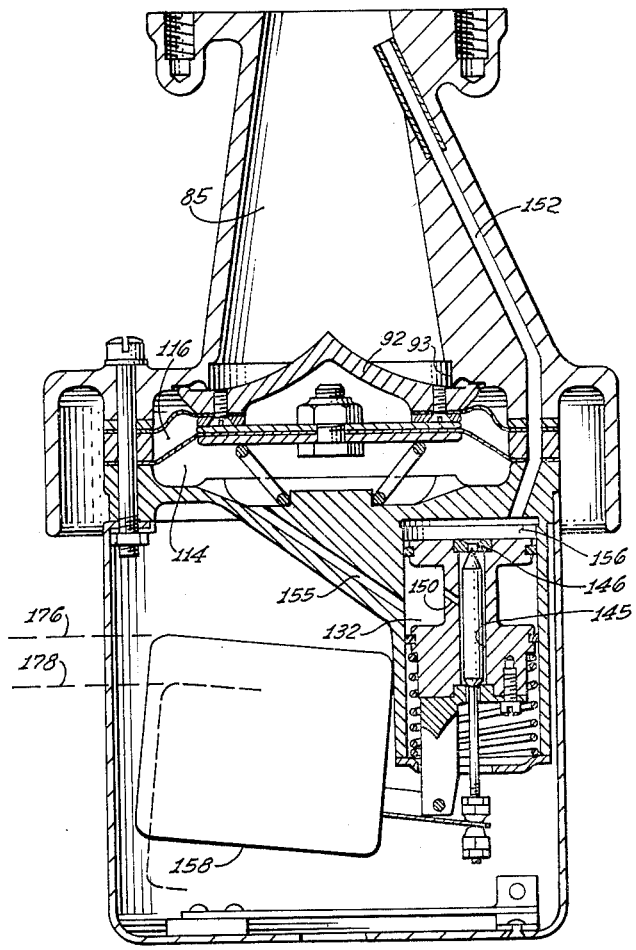
FIG. 4 is a sectional view similar to FIG. 3 showing the same pilot valve at its alternate limit position with the main valve fully closed.

The first pilot valve, shown in FIGS. 3 and 4, includes a pilot valve body in the form of a piston 120 that is slidingly mounted in a cylinder 122 that is integral with the transverse wall 115 and extends downward therefrom. The piston 120 has an upper piston head 124 provided with a circumferential sealing ring 125 and has a lower piston head 126 provided with a second sealing ring 128, the two piston heads being connected by a neck portion 130 which forms an annular space 132 in the cylinder 122.

Figure 3A:
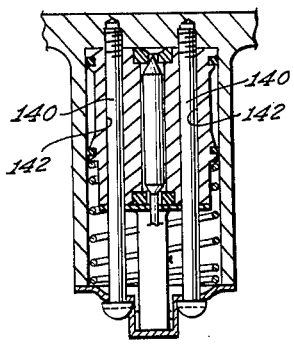
FIG. 3a is a sectional view along the line 3a—3a of FIG. 3 showing how a pilot valve piston slidably engages a pair of guide pins.

The lower end of the cylinder 122 is closed by a cap 137 having a relatively large aperture 138. As may be seen in FIG. 3a, the cap 137 is held in place by a pair of long, smooth screws 140 which serve as guides to keep the piston 120 from rotating on its axis, the guide screws extending through corresponding longitudinal bores 142 in the piston. A suitable coil spring 144 confined under compression between the piston and the cap 137 normally holds the piston against the upper end of the cylinder 122 as shown in FIG. 3.

The piston or pilot valve body 120 is formed with an axial passage 145. At the upper end of the axial passage 145 a suitable plastic bushing forms an inlet port 146 in communication with the inlet side of the main valve member 92 and, in like manner, a second plastic bushing at the lower end of the axial passage forms an outlet port 148 in communication with the exterior of the valve assembly. The two plastic bushings may be made of "Kel–F." A third port in the pilot valve body or piston 120 to communicate with the first lower power chamber 114 is in the form of a lateral bore 150 in the neck portion of the piston.

To place the inlet port 146 in communication with the inlet side of the main valve member 92, a passage 152 of small cross section is formed in the main valve body 80 and terminates in an upper tubular fitting 154 that extends into the inlet passage 85 to receive the impact force or dynamic pressure of the stream of inflowing fuel. To place the third port or lateral bore 150 of the pilot valve body 120 in communication with the first power chamber 114, an inclined bore 155 extends from an intermediate point of the cylinder 122 to the power chamber. It is to be noted that the annular space 132 around the piston is in communication with the inclined bore 155 at all positions of the piston thereby to maintain constant communication between the lateral bore 150 of the piston and the first lower power chamber 114.

It is apparent that the piston 120 is a fluid-pressure-responsive means which functions in the chamber formed by the cylinder 122, the piston being an effect a movable wall that divides the chamber into an upper compartment and a lower compartment. As best shown in FIG. 4, the upper compartment is the space 156 above the piston, which space communicates with the passage 152, and the lower compartment is the previously mentioned annular space 132 that communicates with the first or lower power chamber 114.

A first float 158 which cooperates with the first pilot valve is mounted on one arm of a lever 160 of channel-shaped cross section and the lever in turn is mounted on a pivot 162 at the lower end of a bracket 164 that extends downward from the piston 120. In the construction shown, the bracket 164 is integral with a transverse web 165 and the bracket is mounted on the underside of the piston by means of suitable screws 166 that extend through the web. The second arm of the float lever 160 is pivotally connected to the lower end of a stem 170 of a pilot valve member 172 which is slidingly mounted in the axial bore 145 of the piston 120.

The upper tapered end of the pilot valve member 172 cooperates with the upper inlet port 146 and the lower tapered end of the pilot valve member cooperates with the lower outlet port 148. The stem 170 of the pilot valve member 172 is pivotally connected to the second arm of the float lever by extending through a small aperture in the lever arm, the lever arm being confined between a pair of rounded nuts 174 with each rounded nut secured by a cooperating lock nut 175.

The structure of the second pilot valve shown in FIG. 5 is similar to the construction of the first pilot valve as indicated by the use of corresponding numerals to indicate corresponding parts. The upper end of the cylinder 122a is connected to the tapered intake passage 85 by a passage 152a which terminates in a tubular fitting 154a in the manner heretofore described, and the annular space 132a inside the cylinder is in communication with the second power chamber 116 through an inclined bore 155a. A lateral bore 150a places the interior of the piston 120a in communication with the lateral space 132a. The pilot valve member 172a is controlled in the previously described manner by a corresponding float 158a.

It will be readily understood that the pressure in the two passages 152 and 152a that extend into the inlet passage 85 is relatively low when liquid fuel is flowing from the pressurized source into the tank and especially so because the tapered inlet passage is of the general configuration of a venturi throat. On the other hand, with the inlet passage 85 connected to the pressurized source and with the main valve member 92 in closed position, the pressure in the two passages 152 and 152a is relatively high. The two springs 144 and 144a of the two pilot valves, respectively, are each strong enough to overcome the relatively low pressure in the intake passage 85 during the filling operation but are not sufficient to overcome the high static pressure that is created by the closing of the main valve member 92.

With the fuel tank empty, initial communication between the pressurized fuel source and the value assembly creates sufficient pressure in the intake passage 85 to move the main valve member 92 to its open position in opposition to the resistance of the helical spring 118. Before the main valve member 92 can move fully to its open position, the two pilot valve pistons 120 and 120a may be shifted downward in opposition to the resistances of the two springs 144 and 144a, but when the main valve member 92 is in its fully opened position the consequent drop in pressure in the intake passage 85 results in return of the two pilot pistons to their normal upper positions.

When the rising liquid in the fuel tank approaches the critical level, each of the two pilot valve floats 158 and 158a rises as shown in FIG. 4 and thus pulls downward the corresponding pilot valve member 172 or 172a. As shown in FIG. 4, the downward shift of a pilot valve member 172 or 172a cuts off the corresponding power chamber 114 or 116 from the atmosphere and at the same time places the corresponding power chamber in communication with the intake passage 85. The resulting path of flow communication between the intake passage 85 and the lower power chamber 114 may be traced in FIG. 4 as follows: Passage 152, upper compartment 156, the pilot valve inlet port 146, the axial passage 145 of the pilot valve body or piston 120, the lateral bore 150 of the piston, the annular space 132 around the spool, and the inclined bore 155.

The placing of the lower power chamber 114 in communication with the intake passage 85 in this manner results in prompt buildup of pressure in the power chamber to cause prompt closing of the main valve member 92. As soon as the main valve member 92 reaches its closed position shown in FIG. 4, the resulting rise in pressure in the intake passage 85 causes the pilot valve body or piston 120 to be forced downward against the resistance of the spring 144. This downward movement of the piston carries the float 158 downward a corresponding distance.

FIG. 4 shows the piston in the course of its downward travel. Before the piston shifts downward, the top of the tilted float 158 is at the level indicated by the broken line 176. When the piston completes its downward travel, the top of the tilted float is at the lower level indicated by the broken line 178.

It is apparent that the two pilot valves operate independently to cause the main valve member 92 to move to its closed position. If either of the two pilot valves fails to function, the other pilot valve causes the incoming fuel to be cut off when the tank is full.

Ice particles do not accumulate in the region of the main valve seat 90 because the main valve member 92 either fully closes or fully opens with no tendency whatsoever to pause at a partially open position. Ice particles do not accumulate in either of the two pilot valves because the axial passages through the two piolt valve pistons are relatively short and actual flow through the axial passages occurs only intermittently and for exceedingly short periods of time.

My description in specific detail of the selected embodiments of the invention will suggest various changes, substitutions, and other departures from my disclosure within the spirit and scope of the appended claims.

I claim:

1. In a valve assembly of the character described for controlling the flow of liquid into a tank from a source, the combination of:

a valve body having an inlet port connected to said source and an outlet port communicating with the tank;

a pilot valve means having a first position and an alternate second position;

a main valve means movable to a position to close one of said ports in response to movement of the pilot valve means to its first position, said main valve means being movable to a position to open said one port in response to movement of the pilot valve means to its second position;

a float operatively connected to said pilot valve means to move the pilot valve means to its two positions, the float moving the pilot valve means to its first position in response to rise in the liquid in the tank to a predetermined level; and means to lower the float in the liquid in response to movement of the main valve means to its closed position, thereby to delay the subsequent response of the float to lowering of the liquid level in the tank.

2. In a valve assembly for controlling the flow of liquid into a tank from a source, the combination of:

a valve having an inlet port connected to the source and an outlet port in communication with the tank;

a float in the tank operatively connected to the valve to close the valve in response to rise of the liquid in the tank to a given level; and means to lower the float relative to the level of the liquid in the tank in response to closing of the valve thereby to delay the response of the float to subsequent lowering of the liquid level in the tank.

3. A combination as set forth in claim 2, in which a component of the valve assembly drops when the valve closes and said float is operatively connected to said component to be lowered thereby when the valve closes.

4. A combination as set forth in claim 3, in which said component is a main valve member that opens and closes one of said ports.

5. A combination as set forth in claim 3, in which said component is a pilot valve means that controls a main valve member of said valve.

6. A combination as set forth in claim 2, in which the valve includes a valve seat and a valve member cooperative therewith; and In which one of the valve seat and the valve member has a knife edge for closing action against the other of the valve seat and valve member to cut pieces of ice interposed therebetween.

7. In a valve assembly of the character described for controlling the flow of liquid into a tank from a pressurized source, the combination of:

a valve body having an inlet port connected to the source and an outlet port communicating with the tank;

a main valve member movable to an upper position to open one of said ports and a lower position to close the port;

a pilot valve carried by said main valve member for control thereof; and a float to control said pilot valve to cause the main valve member to move to its closed position in response to rise of the liquid in the tank to a predetermined level, said float being connected to the pilot valve for operation thereof and to be lowered in the liquid thereby when the pilot valve is carried downward by the closing movement of the main valve member.

8. In a valve assembly of the character described for controlling the flow of liquid into a tank from a pressurized source, the combination of.

a main valve body having an inlet port connected to said source and an outlet port communicating with the tank;

a main valve member movable downward from an open position to a position closing one of said ports;

a power chamber to close the main valve member in response to fluid flow into the power chamber from said source;

a pilot valve carried by the main valve member, said pilot valve having a first position to place the power chamber in communication with the tank to permit the main valve member to be moved to its open position by pressure from said source, said pilot valve having a second position to place the power chamber in communication with the source, thereby to cause the main valve chamber to move to its closed position; and a float to move said pilot valve to its second position in response to rise of the liquid in the tank to a given level, said float being connected to the pilot valve for operation thereof and to be lowered in the liquid thereby when the pilot valve is carried downward by the closing movement of the main valve member.

9. In a valve assembly of the character described for controlling the flow of liquid into a tank from a pressurized source, the combination of:

a main valve having an inlet port connected to said source and an outlet port communicating with the tank;

a pilot valve separate from the main valve to control the main valve, said pilot valve being movable between an upper position and a lower position;

fluid-pressure-responsive means to urge the pilot valve to its lower position, said fluid-pressure-responsive means being in communication with the inlet side of the main valve to exert a relatively light force when the main valve is open and to exert a relatively heavy force when the main valve is closed;

yielding means urging the pilot valve towards its upper position, the force exerted by the yielding means being greater than said relatively light force and less than said relatively heavy force whereby the pilot valve takes its upper position when liquid is flowing through the main valve from the source and takes its lower position when the main valve is closed while connected to the source; and float means to operate said pilot valve to cause the main valve to close in response to rise of the liquid in the tank to a predetermined level, said float means being connected to the pilot valve for operation thereof and to be forced downward in the liquid in the tank by the downward movement of the pilot valve when the main valve closes.

10. In a valve assembly of the character described for controlling the flow of liquid into a tank from a pressurized source, the combination of:

a main valve body having an inlet port connected to said source and an outlet port communicating with the tank;

a main valve member in said main valve body movable from an open position to a position closing one of said ports;

a power chamber to force the main valve member from its open position to its closed position in response to fluid flow into the power chamber from said source;

a pilot valve having a first position to place the power chamber in communication with the tank to permit the main valve member to be moved to its open position by pressure from said source, said pilot valve having a second position to place the power chamber in communication with the source thereby to move the main valve member to its closed position;

fluid-pressure-responsive means carrying said pilot valve and movable between an upper position and a lower position, said fluid-pressure-responsive means being in communication with the inlet side of the main valve member to exert a relatively light force when the main valve member is in its open position and to exert a relatively heavy force when the main valve member is in its closed position;

yielding means urging said fluid-pressure-responsive means towards its upper position, the force exerted by the yielding means being greater than said relatively light force and less than said relatively heavy force whereby the fluid-pressure-responsive means takes its upper position when the liquid is flowing through the main valve body from the source and takes its lower position when the main valve member is in its closed position while connected to the source; and float means connected to said pilot valve for operation thereof to cause the main valve member to move to its closed position in response to rise of the liquid in the tank to a predetermined level, said float means being connected to the fluid-pressure-responsive means to be forced downward in the liquid by the downward movement of the fluid-pressure-responsive means when the main valve member moves to its closed position.

11. In a valve assembly of the character described for controlling the flow of liquid into a tank from a pressurized source, the combination of:

a main valve body having an inlet port connected to said source and an outlet port communicating with the tank;

a main valve member movable downward from an open position to a position closing one of said ports;

a power chamber to close the main valve member in response to fluid flow into the power chamber from said source;

fluid-pressure-responsive means comprising a second chamber and a movable wall dividing the second chamber into a first upper compartment and a lower second compartment, said second compartment being in communication with said power chamber, said first compartment being in communication with the inlet side of the main valve member whereby a relatively light force is exerted against said movable wall when the main valve is open and a relatively heavy force is exerted against the movable wall when the main valve is open;

yielding means urging the movable wall upward, the force exerted by the yielding means being greater than said relatively light force and less than said relatively heavy force whereby the movable wall takes an upper position when liquid is flowing through the main valve from the source and takes its lower position when the main valve closes; and a pilot valve body carried by said movable wall, said pilot valve body having a first inlet port in communication with said first compartment, a second port in communication with the interior of the tank, and a third port in communication with said second compartment;

a pilot valve member in said pilot valve body having a first position placing said second port in communication with the third port to cause the main valve to open and having a second position placing the first port in communication with the third port to cause the main valve to close and thereby cause the movable wall to drop in opposition to said yielding means; and float means to move said pilot valve member to its second position in response to rise of the liquid level in the tank to a predetermined level, said float means being connected to the pilot valve member for operation thereof and to be pulled downward in the liquid in the tank by the downward movement of said movable wall thereby to delay the response of the float means to subsequent lowering of the liquid level in the tank.

12. In a valve assembly for controlling the flow of liquid from a pressurized source into a tank, the combination of:
    a normally closed main valve to control flow of the liquid into the tank from the source;
    a pilot valve operative to cause the main valve to close;
    float means operatively connected to the pilot valve to operate the pilot valve in response to raise of the liquid in the tank to a given level; and
    means to lower both said pilot valve and the float a given distance relative to the level of the liquid in the tank in response to closing of the main valve thereby making the float non-responsive to subsequent initial lowering of the liquid level below said given level.

References Cited by the Examiner

UNITED STATES PATENTS

| | | | |
|---|---|---|---|
| 288,331 | 11/1883 | Haskell et al. | 251—38 |
| 2,074,698 | 3/1937 | Langdon | 251—77 |
| 2,842,157 | 7/1958 | Mosher | 137—413 |

ISADOR WEIL, *Primary Examiner.*

D. MATTHEWS, *Assistant Examiner.*